(12) United States Patent  (10) Patent No.: US 7,672,097 B1
Striblen et al.  (45) Date of Patent: Mar. 2, 2010

(54) ELECTRICAL DEVICE WITH CIRCUIT STATUS INDICATOR

(75) Inventors: Fabien Striblen, Verneuil sur Vienne (FR); Thomas N. Packard, Syracuse, NY (US); William Greener, Richford, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 468 days.

(21) Appl. No.: 11/349,009

(22) Filed: Feb. 7, 2006

(51) Int. Cl.
*H02H 9/08* (2006.01)
*H02H 3/00* (2006.01)

(52) U.S. Cl. ........................................................ 361/42
(58) Field of Classification Search .................... 361/42
See application file for complete search history.

(56) References Cited

U.S. PATENT DOCUMENTS

| | | | |
|---|---|---|---|
| 4,412,193 A | | 10/1983 | Bienwald et al. |
| 4,568,997 A | | 2/1986 | Bienwald et al. |
| 4,574,324 A | | 3/1986 | Packard |
| 4,739,450 A | | 4/1988 | Misencik |
| 5,202,662 A | | 4/1993 | Bienwald et al. |
| 5,363,269 A | | 11/1994 | McDonald |
| 5,541,800 A | | 7/1996 | Misencik |
| 5,847,913 A | * | 12/1998 | Turner et al. ............. 361/93.1 |
| D427,887 S | | 7/2000 | Leopold et al. |
| D430,539 S | | 9/2000 | Leopold et al. |
| 6,433,555 B1 | | 8/2002 | Leopold et al. |
| 6,442,007 B1 | * | 8/2002 | Li ................................. 361/42 |
| 6,515,564 B2 | | 2/2003 | Leopold et al. |
| 6,525,541 B1 | | 2/2003 | Leopold |
| 6,829,124 B2 | | 12/2004 | Leopold et al. |
| 6,856,498 B1 | | 2/2005 | Finlay, Sr. |
| 6,949,995 B2 | | 9/2005 | Leopold et al. |
| D512,021 S | | 11/2005 | Fort et al. |
| D521,932 S | | 5/2006 | Fort et al. |
| 7,195,500 B2 | * | 3/2007 | Huang et al. .............. 439/107 |

\* cited by examiner

*Primary Examiner*—Ronald W Leja
(74) *Attorney, Agent, or Firm*—Daniel P. Malley; William Greener; Bond, Schoeneck & King, PLLC

(57) ABSTRACT

An electrical control device including an electrical circuit, wherein the electrical circuit has a circuit protection component such as, e.g., a ground fault circuit interrupter (GFCI). The exemplary GFCI includes a TEST circuit activator and a RESET circuit activator, as well as a visual circuit status indicator indicia that is in an active (illuminated) state when the circuit is in a fault condition. The status indicator indicia is visually, physically, ergonomically or otherwise positively informatively associated with the TEST circuit activator and/or the RESET circuit activator. The positive informative association between the indicator indicia and the TEST circuit activator and/or the RESET circuit activator may be made by physical and/or visual boundaries or markings on a cover portion of the device or by integrally incorporating the indicia in the TEST circuit activator and/or the RESET circuit activator. The indicia may be a steady state or a blinking illumination. According to an aspect, a prompting indicator provides a prompting indicia for a user to activate the TEST circuit activator and/or the RESET circuit activator or replace a defective component of the device.

23 Claims, 11 Drawing Sheets

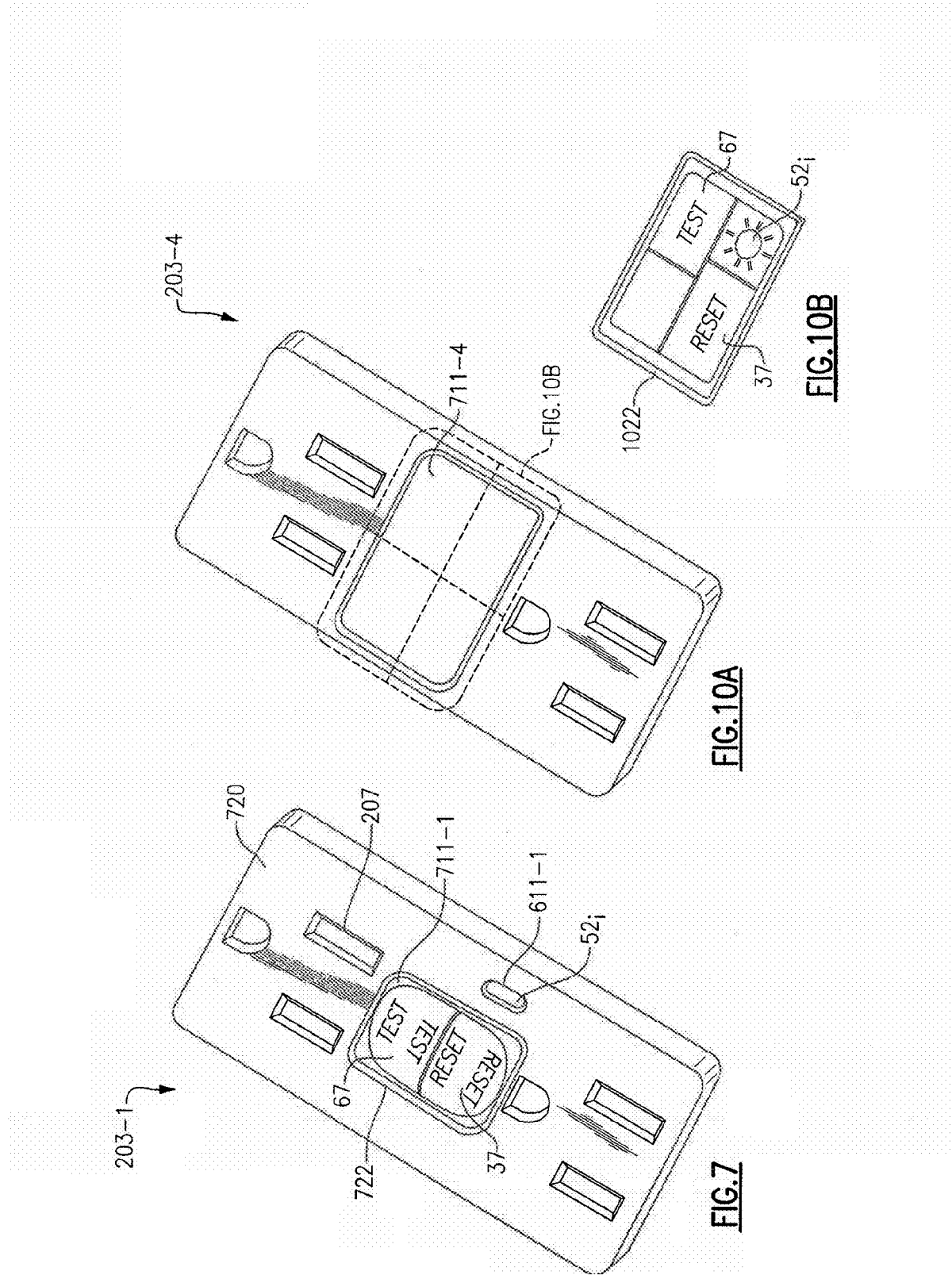

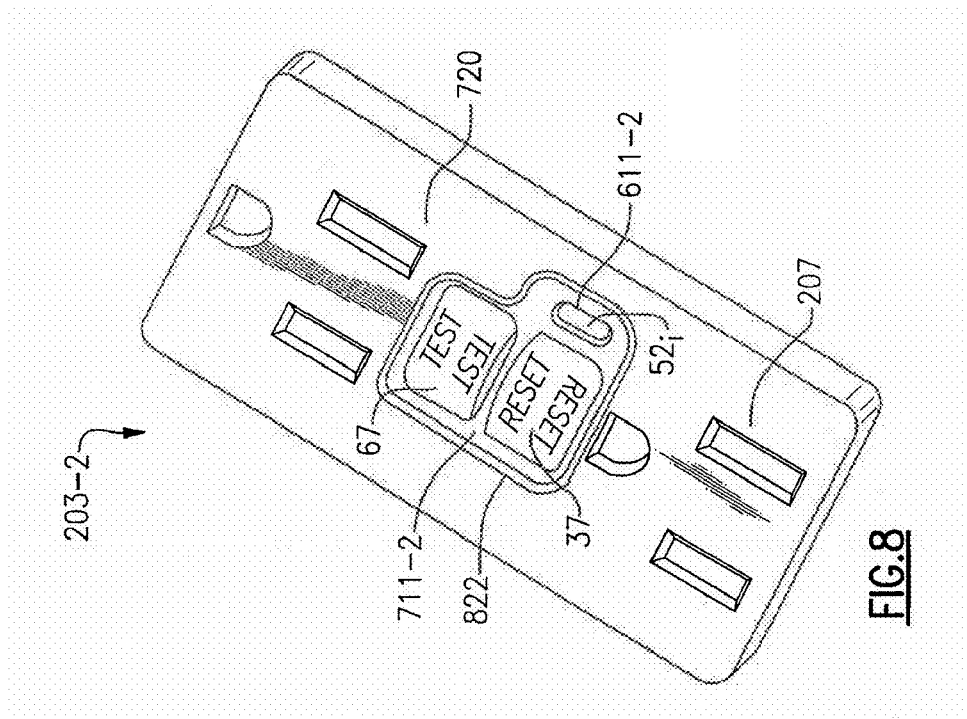
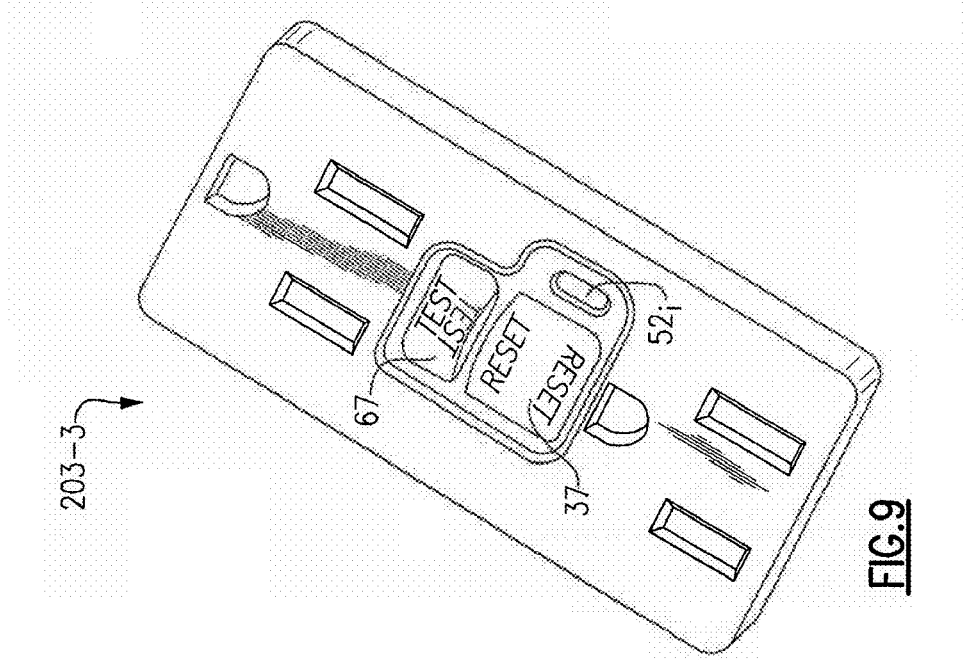

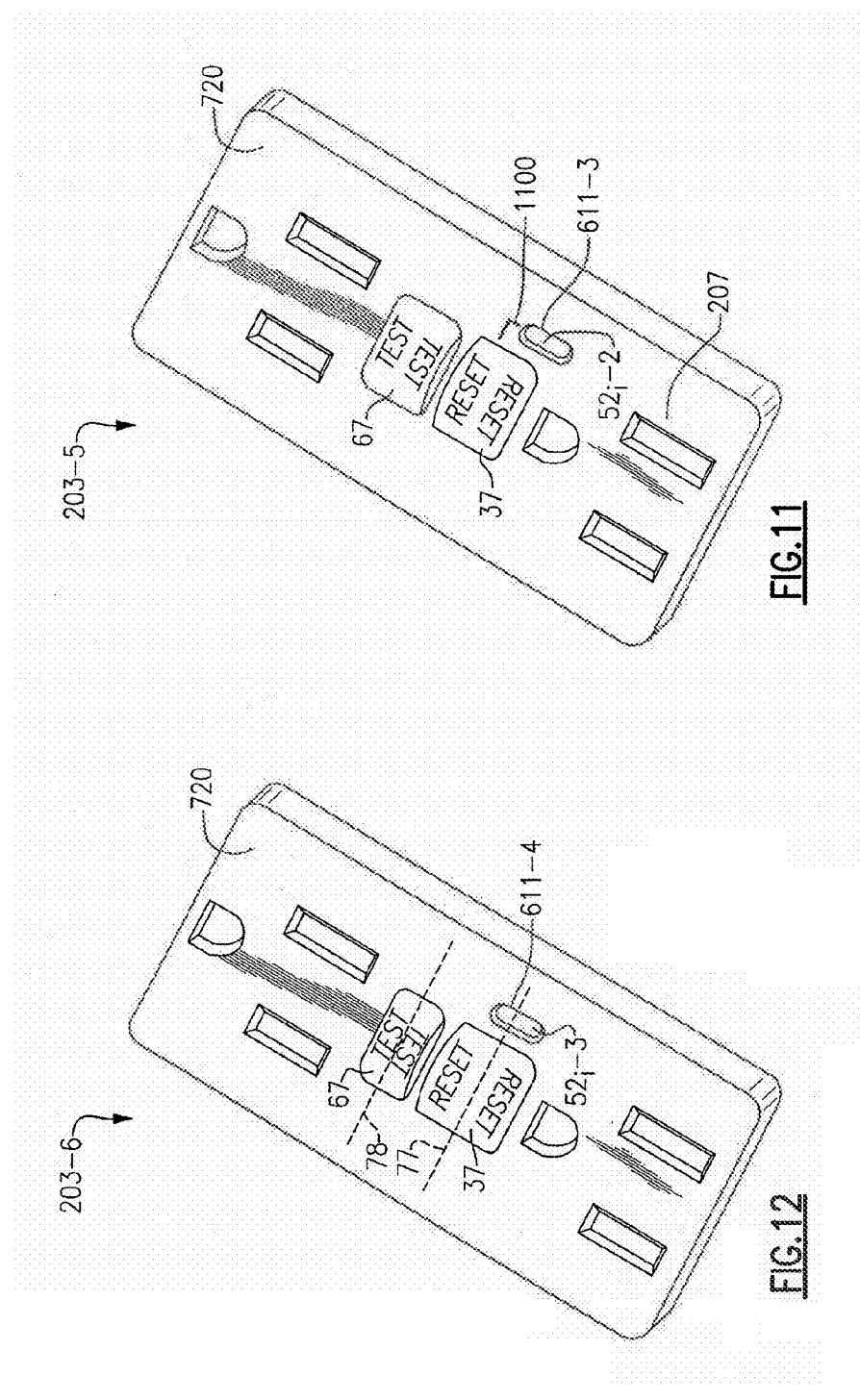

ELECTRICAL DEVICE WITH CIRCUIT STATUS INDICATOR

RELATED APPLICATION DATA

None.

BACKGROUND OF THE INVENTION

1. Field of the Invention

Embodiments of the invention generally relate to the field of electrical wiring devices that include a circuit protection component such as a ground fault circuit interrupter (GFCI). More particularly, embodiments of the invention are directed to an electrical wiring device that includes a circuit protection component having an optical/visual circuit status or condition indicator, which is physically, visually, ergonomically or otherwise informatively associated with a circuit RESET or TEST activator component of the device.

2. Description of Related Art

Ground fault circuit interrupter (GFCI) devices are designed to trip in response to the detection of a ground fault condition in a load circuit. Generally, the ground fault condition results when a person comes into contact with a line (or hot) conductor in the load circuit and an earth ground at the same time. This situation can result in serious injury. The GFCI device detects this type of condition by using a sensing transformer to detect an imbalance between the currents flowing in the line and neutral conductors of the AC supply, as will occur when some of the current to the load circuit is being diverted to ground. When such an imbalance is detected, a circuit breaker within the GFCI device is tripped to an open condition, thereby opening at least the line conductor to the load and removing power from the ground fault.

GFCIs are just one member of a family of protective devices that also includes arc fault circuit interrupters (AFCIs) and units that include both AFCI and GFCI protection. An AFCI is designed to detect an electrical arcing condition that if allowed to persist could ignite nearby combustibles. Arcs may occur in a loose electrical connection intended to carry current to a load, or between two electrical conductors that are not isolated electrically from each other. An arc fault condition typically manifests itself as a high frequency current signal. Accordingly, an AFCI may be configured to detect various high frequency signals and trip a circuit breaker. As a result of the tripping, the load circuit along with the arc fault current is interrupted before combustibles in proximity to the arcing fault have a chance to ignite. Whereas the principles of the invention are described in concert with GFCI devices, it is to be understood that they are applicable to other protective devices such as those set forth herein by way of example.

GFCI devices come in various forms, including portable or line cord devices and central units that provide protection for a portion of the AC wiring throughout a structure. Central units are, by way of example, GFCI circuit breakers incorporated in an electrical distribution panel and GFCI receptacles incorporated into wall-mounted AC electrical receptacles that are designed for installation at various locations within a building. A typical receptacle configuration consists of a housing adapted to be received within a standard electrical box, with a pair of standard two- or three-prong AC outlets, a 'TEST' pushbutton and a 'RESET' pushbutton accessible through the front of the housing. At the rear of the housing, two pairs of screw terminals are ordinarily provided. One pair of screw terminals, which are sometimes referred to as source or line terminals, allow the line and neutral conductors from an AC source to be connected to the GFCI receptacle, and these terminals are connected to the electrical outlets at the front of the housing via the GFCI circuitry and circuit interrupter within the housing. The second pair of screw terminals, which are sometimes referred to as load or feed-through terminals, are connected directly in parallel with the contacts of the AC outlets. This provides the installer with the option of connecting a standard, non-GFCI AC receptacle to the GFCI receptacle. The GFCI receptacle provides ground fault protection to the standard receptacle's outlets without the need to provide a separate GFCI circuit. The standard receptacle may be located remotely from the GFCI receptacle, but will ordinarily be close enough (e.g., in the same room) so that convenient resetting is possible when a ground fault condition occurs.

The TEST pushbutton referred to above allows a user to manually initiate a simulated fault condition to test the operating condition of the GFCI. Actuation of the TEST pushbutton results in removal of power from the load circuit which is typically indicated on the device by the popping out of the RESET pushbutton. To restore power to the load circuit, the user actuates the RESET pushbutton.

Unfortunately, there is a problem with GFCI receptacles of the type described above, in that the installer may erroneously connect the incoming AC source conductors to the load or feed-through terminals of the receptacle rather than to the source or line terminals. Because of the nature of the internal wiring of a GFCI receptacle, this miswiring condition is not easily detected. AC power can still be present at the receptacle outlets, making it appear that the GFCI receptacle is operating normally and providing the desired ground fault protection. If the TEST pushbutton is depressed, the circuit breaker within the GFCI receptacle will be released and the RESET pushbutton will pop out, again making it appear that the GFCI receptacle is operating normally and providing the desired ground fault protection. In reality, however, no such protection is being provided because the AC source has been wired directly to the receptacle outlets without passing through the internal circuit breaker of the GFCI device.

It is known to provide a GFCI receptacle with a visual indicator, such as a light-emitting diode (LED), to indicate that the GFCI has been properly wired. If the receptacle has been wired properly, the LED is extinguished in response to activating the test button. However, in the event that the receptacle has been miswired by connecting the AC source to the load terminals rather than to the line terminals, the LED is not extinguished when a ground fault condition occurs. Thus, the LED remains illuminated to serve as an indication that the receptacle has been miswired. Unfortunately, however, the installer of the receptacle cannot necessarily be relied upon to understand the operation of the LED. That is, the failure of the LED to extinguish after the TEST button is depressed may not be interpreted by the installer as an abnormal condition, particularly since the installer will observe the popping out of the RESET button. Thus, the miswiring of the receptacle may not be detected and a dangerous condition may be allowed to persist.

Known GFCIs have included various types of visual indicators. Examples are trip indicators that illuminate when the circuit breaker has tripped, pilot indicators that illuminate when the circuit breaker is reset, and end-of-life indicators that illuminate when the GFCI is experiencing an internal fault condition and is no longer affording protection. Due to the plethora of indicators, the user may mistakenly believe that the particular indicator is for one purpose when in fact it is included in the GFCI for an entirely different purpose. As a result, visual indicators have led to confusion rather than to solution. This is particularly true in construction sites, hotel rooms, and other similar situations where someone may be confronted by an unfamiliar device model.

Known visual indicators have been somewhat effective for indicating a status of the load circuit. The trip indicator, for example, emits light to indicate that power is not available in the load circuit and even that the GFCI is responsible for the loss. Unfortunately these indicators do not guide the user in what to do next.

In another aspect, a GFCI is periodically tested by way of the TEST button and RESET button. A visual indicator, if provided, is typically in proximity to these buttons. Unfortunately given the variety of meanings of visual indicators, the indicator may cause confusion about how the test and reset buttons are to be manipulated and even whether or not the test passed. As a result of the testing process not being user friendly, some users have shied away from testing, thus a device no longer affording protection remains in service.

What is needed is a user-friendly visible indicator. In particular, what is needed is a visible indicator configured to lead the user to perform a pre-determined task in an intended manner.

SUMMARY OF THE INVENTION

Embodiments of the invention are generally directed to an electrical wiring device that includes a fault protection device and an optical/visual circuit status (e.g., ground fault, miswire, end of life, etc.) indicator, which is physically, visually, ergonomically or otherwise informatively associated with a circuit RESET activator component and/or a circuit TEST activator component of the device. The informative association means that the status indicator will positively inform the user of the circuit status of the device via the physical, visual, ergonomic or otherwise associative relationship between a status indicator indicia and the TEST and/or RESET activator components of the device.

An embodiment of the invention is directed to an electrical device that comprises a body portion including an electrical circuit. The electrical circuit further includes a hot line terminal, a neutral line terminal, a hot load terminal, a neutral load terminal, a hot receptacle terminal, a neutral receptacle terminal and a protective device. The protective device includes a TEST circuit activator and a RESET circuit activator, and a circuit status indicator indicia that, in one aspect, is visually, informatively associated with the RESET circuit activator and, in another aspect, is visually, informatively associated with the TEST circuit activator. The circuit status indicator indicia is in an active, illuminated (steady or blinking) state when the electrical circuit of the device is in a tripped state, has reached an end of life condition, or a circuit fault is present, for example. The electrical device is further characterized by having a cover portion with at least one terminal contact (receptacle) aperture and at least one aperture that provides physical and/or visual access to the TEST circuit activator, the RESET circuit activator, and the circuit status indicator indicia. Thus it is intended that a user of the device will positively know the electrical status of the circuit from the associative relationship between the circuit status indicator indicia and the RESET and/or TEST circuit activator components. According to various aspects, the informative, associative relationship between the status indicator indicia and the TEST and/or RESET activators is established by physical and visual proximity of the indicia to these components. In one example, the layout of a visual boundary positively associates the indicia with the RESET or TEST activator. The indicia may be a steady or blinking illumination. One or more illumination colors (e.g., green/red) may be used to alert the user to a particular status condition. According to another aspect, the circuit status indicator indicia is integrally disposed within the RESET circuit activator and is illuminated to inform the user to reset the circuit. Alternatively, the circuit status indicator indicia could be integrally disposed in the TEST circuit activator. In another aspect, markings produced, for example, by transfer-printing, painting, etching, molding, scribing scoring, stamping, labeling or otherwise could directly associate the status indicia with a respective activator component.

Any of the embodiments described above may further include an auxiliary switch that is electrically coupled to the protective device wherein the circuit status indicator is electrically connected in parallel with the auxiliary switch. In an illustrative aspect, the electrical circuit of the electrical device is a two-pole circuit. Alternatively, the electrical circuit is a four-pole circuit.

In another embodiment, means are provided for prompting the user to respond to an indicator indicia in a certain manner. For example, an indicia in the RESET activator may blink when an end of life condition is detected. Upon activating the RESET activator, the indicia continues to blink and the circuit does not reset, thus informing the user to replace the circuit device. In a related exemplary embodiment, an indicator indicia associated with the TEST activator is operatively connected to a timer. The timer is programmed to activate the indicia at various time intervals to inform the user to test the circuit, upon which the indicia becomes inactive.

The benefits and advantages provided by the various embodiments of the invention will become more apparent in view of the detailed description and the drawings set forth herein below and as defined in the appended claims.

BRIEF DESCRIPTION OF THE DRAWINGS

FIG. 7 is a perspective schematic view illustrating an associative layout of the device according to an exemplary aspect of the invention;

FIG. 8 is a perspective schematic view illustrating an alternative associative layout of the device according to an exemplary aspect of the invention;

FIG. 9 is a perspective schematic view illustrating an alternative associative layout of the device according to an exemplary aspect of the invention;

FIG. 10 is a schematic view illustrating an alternative associative layout of the device according to an exemplary aspect of the invention;

FIG. 11 is a perspective schematic view illustrating an alternative associative layout of the device according to an exemplary aspect of the invention;

FIG. 12 is a perspective schematic view illustrating an alternative associative layout of the device according to an exemplary aspect of the invention;

DETAILED DESCRIPTION OF AN EMBODIMENT OF THE INVENTION

Reference will now be made in detail to the present exemplary embodiments of the invention, examples of which are illustrated in the accompanying drawings. Wherever possible, the same reference numbers will be used throughout the drawings to refer to the same or like parts.

Embodiments of the invention are generally directed to an electrical wiring device that includes a GFCI or other type of circuit protection device, and an optical/visual circuit status indicator that is physically, visually, ergonomically or otherwise informatively associated with a RESET circuit activator and/or a TEST circuit activator of the device.

Figure 1:
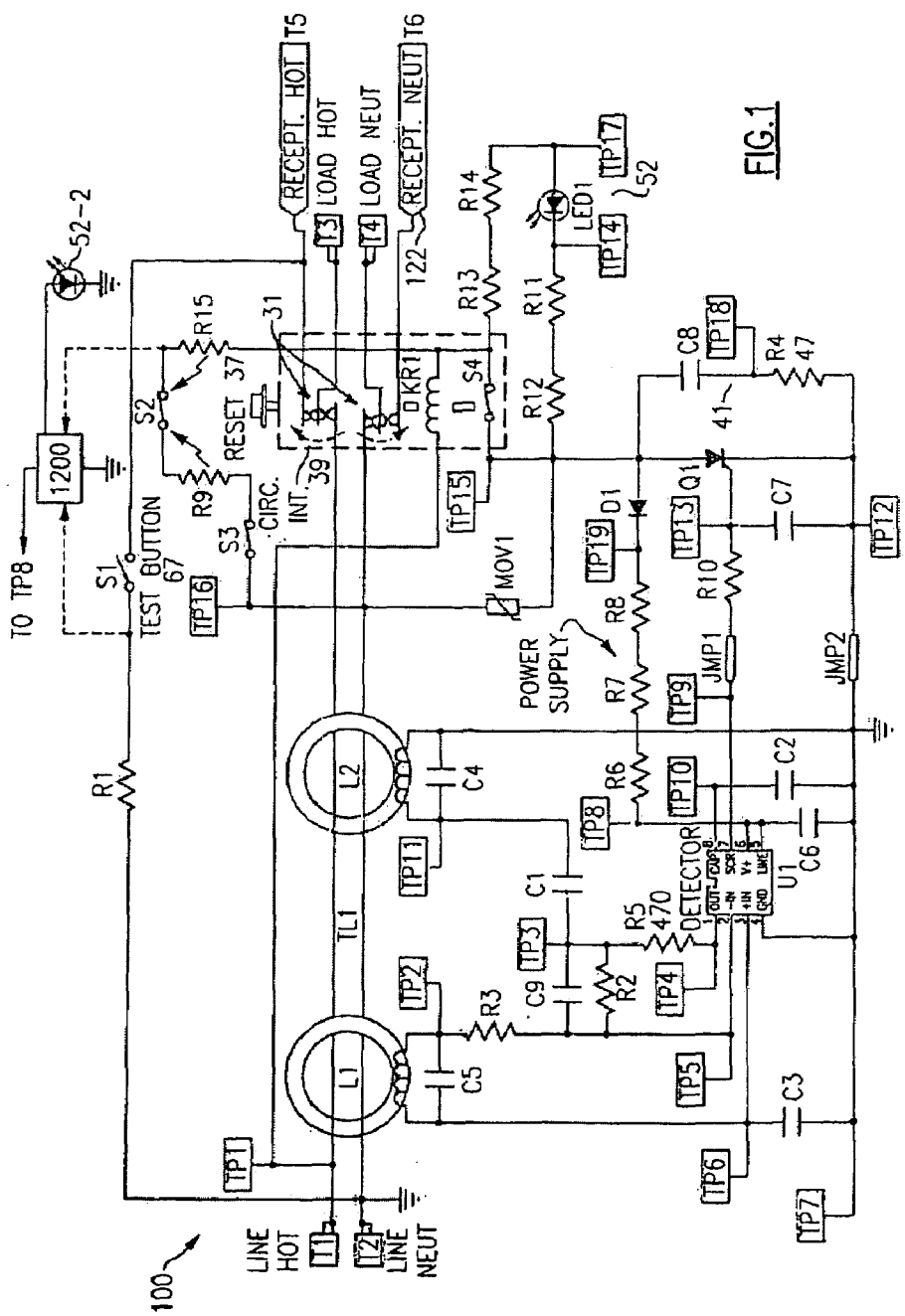
FIG. 1 is a schematic circuit diagram of an illustrative GFCI usable in accordance with an embodiment of the invention.

FIG. 1 shows an illustrative electrical schematic of a GFCI circuit 100 employed in a device 200-1 as shown in FIGS. 2-6, according to an exemplary embodiment of the invention. The particular GFCI circuit shown in FIG. 1 is not part of the invention per se. Other GFCI circuits, or for that matter circuits configured for other types of protective devices, may be suitable. Details of the circuit are presented to aid in the reader's understanding of the invention. The device circuitry includes a hot line terminal T1, a neutral line terminal T2, a hot load terminal T3, a neutral load terminal T4, a hot receptacle terminal T5 and a neutral receptacle terminal T6. The illustrative GFCI includes a four-pole circuit interrupter that features a sandwiched cantilevered contact structure as variously illustrated in FIGS. 2-5. The line terminals (T1, T2) are electrically connected to feed-through load terminals (T3, T4) and the receptacle load terminals when the circuit is reset as shown at 31 in FIG. 1. When in the 'tripped' state, the line, load, and receptacle contacts are disconnected from each of the other contacts. In two-pole structures, there is electrical continuity between the receptacle contacts and the feed-through load contacts in the tripped state. On the other hand, in a four-pole structure, the connection between the receptacle contacts and the feed-through load contacts is interrupted in the tripped state.

The circuit 100 includes a differential transformer L1 that is configured to sense load-side ground faults. Transformer L2 is configured as a grounded neutral transmitter and is employed to sense grounded-neutral fault conditions. Both transformers are disposed in toroid assembly TL1. Both differential transformer L1 and grounded-neutral transformer L2 are coupled to detector integrated circuit U1. Detector U1 is powered by a power supply circuit connected via pin V+. The detector output, provided on output pin 7, is connected to the control input of SCR Q1. Resistor R10 and capacitor C7 filter the detector output signal. A snubber circuit 41 including capacitor C8 and resistor R4 prevents voltage transients between the hot and neutral conductors from triggering SCR Q1.

When SCR Q1 is turned ON, solenoid KR1 is energized, actuating the four-pole circuit interrupter 39. Solenoid KR1 remains energized for a time period that is typically less than about 25 milliseconds. Solenoid KR1 energization causes the four-pole interrupter 39 to trip, eliminating the fault condition. After the fault condition has been eliminated, the circuit interrupter may be reset by way of RESET button 37 (referred to herein below as the RESET circuit activator). The reset mechanism in the illustrative GFCI 100 is purely mechanical although this is not to be construed as a limitation of the invention. Other known reset mechanisms employ an electronic reset mechanism, for instance.

The GFCI circuit 100 addresses certain end of life conditions by denying power to the load when the device is unable to function. As an example of an end of life condition, solenoid KR1 is susceptible to burn-out if SCR Q1 becomes shorted out, or is permanently turned ON. Solenoid KR1 may burn out if it is energized for more than about 1 second. Once the solenoid burns out, the circuit interrupter is incapable of being tripped. Accordingly, the exemplary GFCI prevents solenoid burn-out by providing auxiliary switch S4. Auxiliary switch S4 is configured to open when the circuit interrupter 39 is in the tripped position. If SCR Q1 is shorted out, or permanently ON, auxiliary switch S4 ensures that solenoid KR1 is not permanently connected to a current source. The user may attempt to reset the device by depressing the RESET circuit activator 37, but the circuit interrupter will immediately trip in response to the current flowing through the solenoid. Because the trip mechanism is coupled to the auxiliary switch S4, auxiliary switch S4 is opened before solenoid KR1 burns out.

Another failure mode that is addressed by the illustrative GFCI circuit 100 relates to the differential movistor MOV1. Movistor MOV1 is disposed in series with auxiliary switch S4 and trip solenoid KR1 to significantly reduce the probability of damage due to an over-current situation. It is known that protective devices frequently employ metal oxide varistors (MOV) to protect the electrical circuit from voltage surges that sometimes occur in the electrical distribution system. The end-of-life failure mode of a MOV is typically an electrical short. The resulting current through the shorted MOV may be enough to thermally damage the enclosure of the protective device. Accordingly, when MOV1 reaches end-of-life and shorts out, trip solenoid KR1 is energized to thereby open auxiliary switch S4. As described above, when auxiliary switch S4 opens, the flow of short circuit current is terminated before any damage ensues.

The illustrative GFCI circuit 100 also includes a fault indicator 52 implemented by LED 1, that is disposed in parallel with auxiliary switch S4. Fault indicator 52 emits a visual/optical (i.e., illumination) signal indicia when the circuit interrupter 39 and the auxiliary switch S4 are in a tripped (electrically open) or other fault state.

As further illustrated in FIG. 1, a miswire circuit is coupled between the line terminals (T1, T2). The miswire circuit is configured to prevent the ability to reset circuit interrupter 39 when there is a miswire fault condition. The miswire circuit includes a fault resistance (R9, R15) that is designed to generate a differential current in excess of a predetermined fault threshold (e.g., 6 milliamperes). Switch S2 is implemented as a solder link that is designed to melt after a predetermined period of time. Switch S3 is a miswire fuse that enables the miswire circuit. The miswire circuit operates as follows. When the GFCI 100 is both tripped and miswired, nothing visible happens. However, no power is provided to the receptacle terminals due to the circuit interrupter being tripped. If the GFCI is in the reset state, it will immediately trip when power is applied to the load side even before switch S2 opens. Illustratively, the estimated time it takes for the miswire switch S2 to "clear," or burn out, is greater than 50 ms. The trip time of the GFCI is less than or equal to 25 ms. Accordingly, miswire switch S2 does not have enough time to clear. If one attempts to reset the device when in the miswired condition, the device repeatedly trips until the device is wired correctly. When the device is in the tripped condition, the fault indicator 52 illuminates.

When electrical power is correctly supplied to the line terminals (T1, T2), a differential current is again created by the miswire resistance (R9, R15). If the device is reset before power is applied, the device trips as a result of this differential current. If the device is already in the tripped condition before power is applied, nothing visible happens. However, because the miswire switch S2 is on the line side of the circuit interrupter, the current through S2 continues to flow, clearing the solder link S2 in a short time, typically 50 ms to 5 seconds. After solder link S2 has cleared, the device can then be reset and indicator 52 extinguishes.

The illustrative GFCI circuit 100 also includes a test circuit. The test circuit is coupled between the line neutral terminal T2 and the hot receptacle terminal. The test circuit includes a TEST activator 67 disposed in series with test resistor R1.

FIGS. 2-6 show plan perspective views of electrical device 200-1. FIGS. 2-5 are partially assembled views of the device in which various components have been omitted for purposes of illustration.

Figure 2:
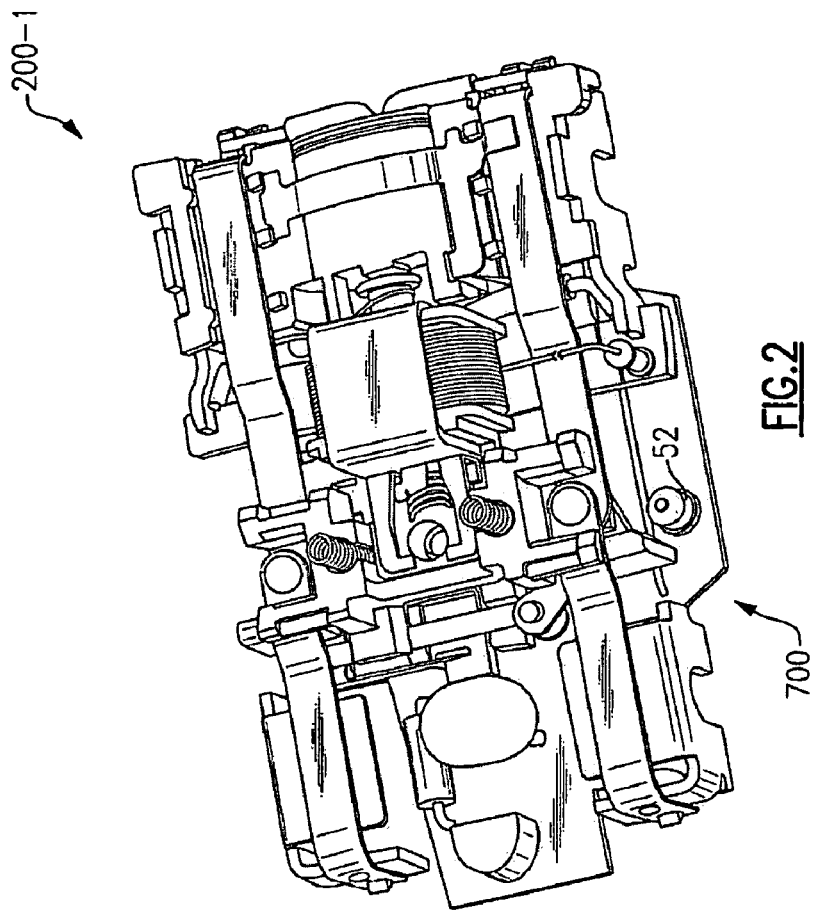
FIG. 2 is a plan perspective view of a partially assembled electrical device according to an exemplary embodiment of the invention.

FIG. 2 shows the electrical subassembly 700.

Figure 3:
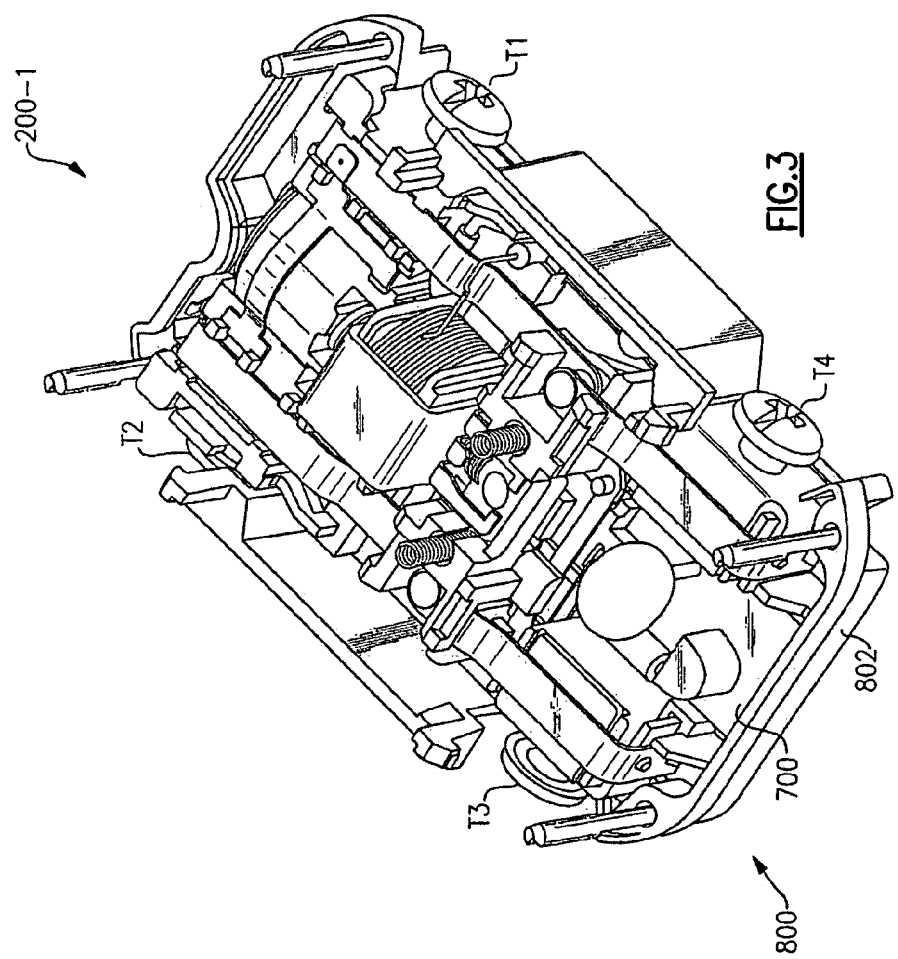
FIG. 3 is a perspective diagrammatic view of a next level assembly of the device components as illustrated in FIG. 2.

FIG. 3 shows a plan perspective view of a back cover subassembly 800, including electrical subassembly 700, back cover 802, terminals T1, T2, T3 and T4, and test resistor R1.

Figure 4:
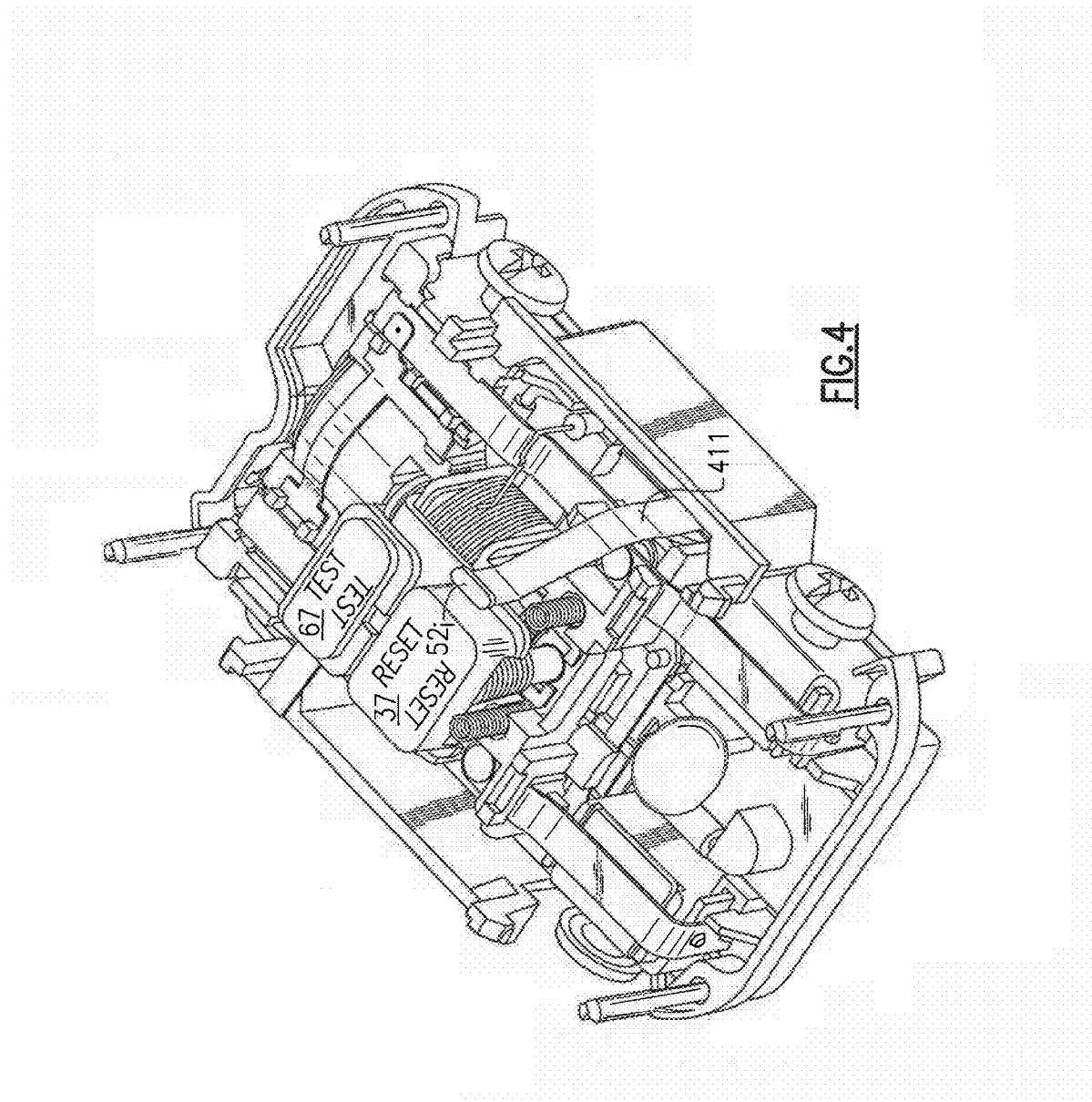
FIG. 4 is a perspective schematic view of a next level assembly of the device components as illustrated in FIG. 3.

FIG. 4 shows a plan perspective view that includes the previously described components. In addition, RESET and TEST circuit activators 37, 67, and light pipe 411 have been added. When TEST circuit activator 67 is activated, the hot load circuit is electrically connected to the neutral line circuit by way of resistor R1 resulting in the generation of a simulated fault signal. When activated, RESET circuit activator 37 resets circuit interrupter 39 (FIG. 1). Light pipe 411 provides a physical interface between the fault indicator 52 (FIG. 2) and a circuit status indicator indicia $52_i$. Similarly, an optical fiber or other known optically transmissive medium could be used as the physical interface between the indicator optical source and the indicator visual indicia.

Figure 5:
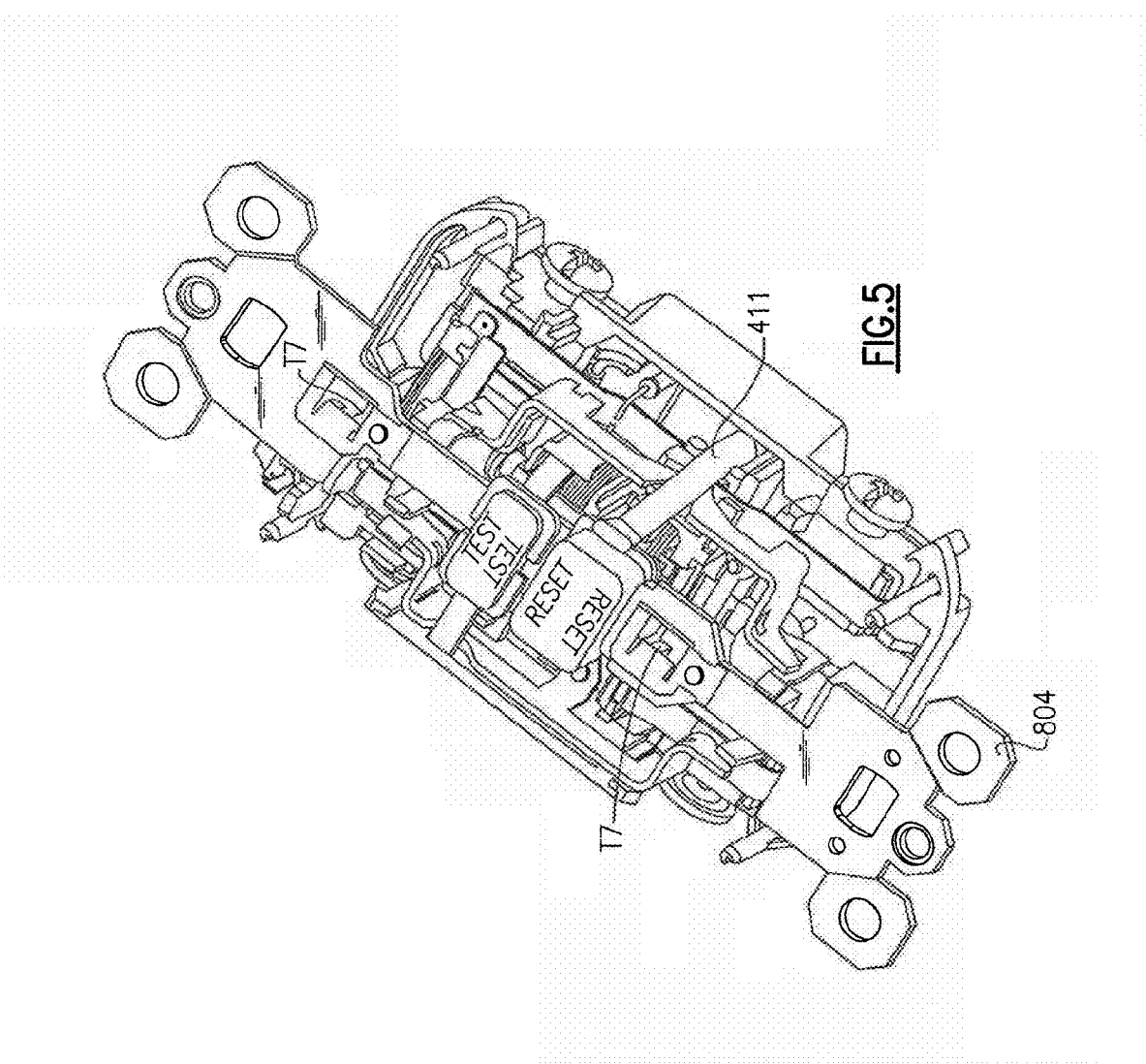
FIG. 5 is a perspective schematic view of a next level assembly of the device components as illustrated in FIG. 4.

FIG. 5 shows a plan perspective view of the device that includes the previously described components. Also included are mounting bracket 804 and at least one set of receptacle terminals T5, T6 (FIG. 1). Mounting bracket 804 is configured to permit attachment of the device to an outlet box or panel during installation. Mounting bracket 804 includes a terminal T7 associated with each pair of terminals T5, T6. Terminals T7 are electrically connected to the ground potential of the electrical distribution system. Each set of terminals T5, T6, T7 are configured to align with the blades of a user attachable plug.

Figure 6:
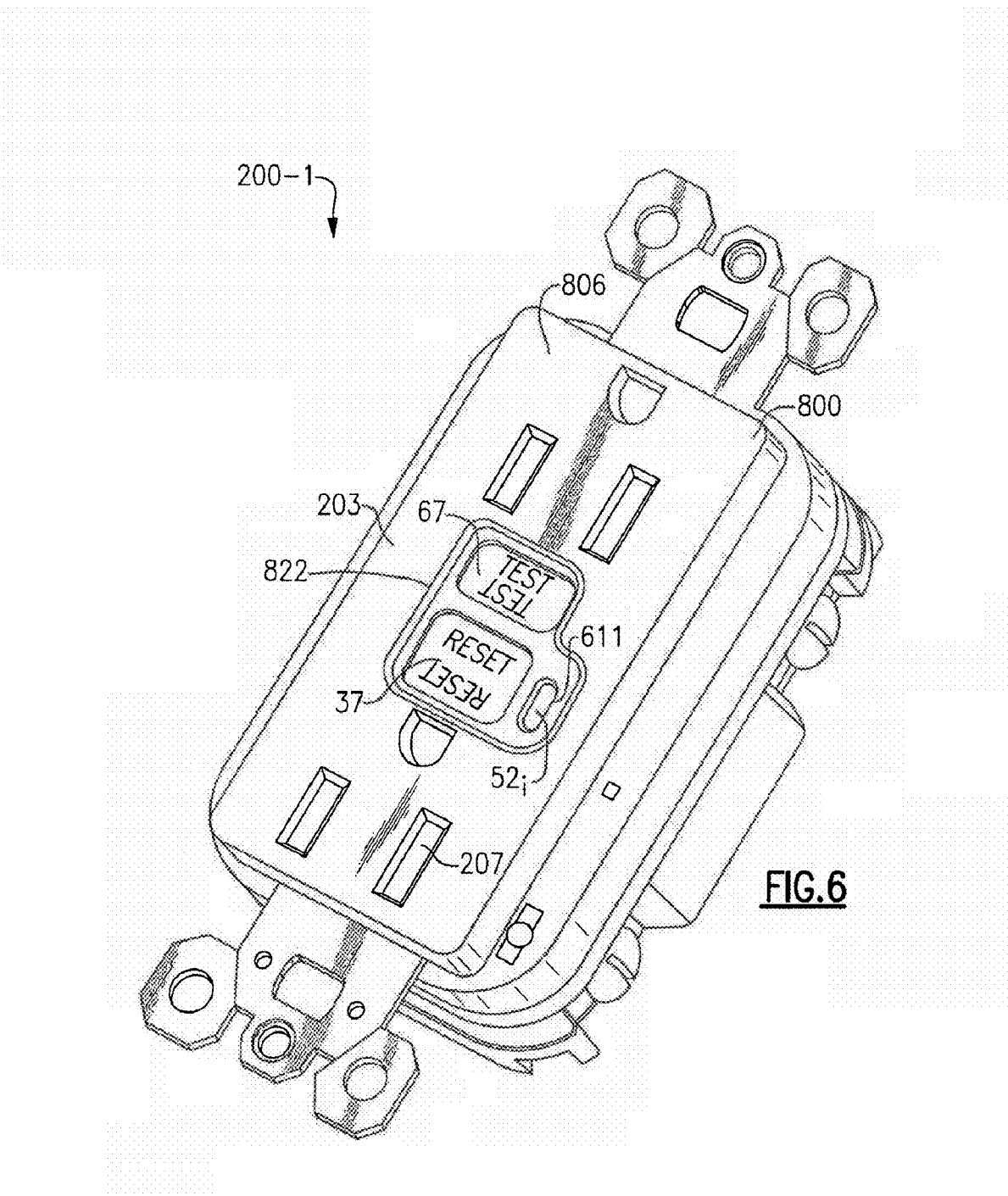
FIG. 6 is a perspective schematic view of a fully assembled device as partially illustrated in FIGS. 2-5 according to an exemplary embodiment of the invention.

As shown in FIG. 6, the device includes the components that have been previously described plus a front cover 806. Front cover 806 includes openings that correspond to terminals T5, T6, T7 that are likewise configured to accept the blades of an attachment plug. When the blades are inserted into the openings, the blades becomes electrically connected to the corresponding terminals. Device 200-1 supplies power by way of the plug to a user attachable load. In other aspects, front cover 806 is configured to permit user access to the TEST circuit activator 67 and RESET circuit activator 37. As illustrated, front cover 806 includes an aperture 611 configured to surround the distal end of light pipe 411. In this manner, the circuit status indicator indicia $52_i$ is visible to the user. In an alternate embodiment, aperture 611 may include a transparent lens. The distal end of light pipe 411 is interiorly disposed with respect to the lens. Consequently, circuit status indicator indicia $52_i$ is substantially transmitted to the outer surface of the lens.

As indicated hereinabove, the fault indicator 52 (or, effectively, the indicia $52_i$ of the fault indicator 52) is informatively associated with the RESET and/or TEST circuit activators 37, 67; i.e., there is a visual, physical, ergonomic or otherwise positive informative association between the respective circuit activator and the illuminated fault indicator indicia when a fault condition exists. According to various aspects, the illuminated or otherwise activated state of the indicator indicia is intended to positively inform the user that the circuit needs to be reset or tested, for example, by engaging the appropriate circuit activator, to be operational. The visual, physical, ergonomic or otherwise informative associative relationship between the RESET and/or TEST circuit activators and the fault indicator/indicia is achieved according to aspects of the invention described herein as follows.

FIG. 7 shows an exemplary device cover portion 203-1 illustrating an aspect of the associative layout between the RESET circuit activator 37 and the circuit status indicator indicia $52_i$, and the TEST circuit activator 67. The cover portion 203-1 has a recessed aperture 711-1 with a contiguous boundary 722. RESET circuit activator 37 and TEST circuit activator 67 are form fit into the recessed aperture and can be engaged by a user. A physically separate indicia aperture 611-1 is provided for viewing the circuit status indicator indicia $52_i$. In the instant aspect, the RESET and TEST circuit activators 37, 67 are immediately vertically adjacent while the indicia aperture 611-1 is separately disposed adjacent the RESET circuit activator outside of the boundary of aperture 711-1. This placement of the indicator indicia establishes the associative relationship between the circuit status indicator and the RESET activator.

An alternative associative relationship is illustrated in FIG. 8. Device cover portion 203-2 includes an L-shaped recessed aperture 711-2 with respect to surface 720, in which is disposed the circuit status indicator indicia aperture 611-2, as well as the RESET and TEST activators. In this aspect, the aperture 711-2 has a contiguous boundary 822 that encircles the RESET and TEST circuit activators as well as the indicator indicia. Similar to the aspect illustrated in FIG. 7, the RESET and TEST circuit activators 37, 67 are immediately vertically adjacent while the indicator indicia is disposed adjacent the RESET circuit activator, thus emphasizing their associative relationship.

FIG. 9 illustrates an associative relationship identical to that shown in FIG. 8. However, the RESET circuit activator 37 is physically larger than the TEST circuit activator 67 to accentuate the informative relationship between the RESET circuit activator and the indicator indicia $52_i$.

FIGS. 10A and 10B show an alternative associative relationship layout in the cover portion 203-4 between the indicator indicia $52_i$ and the RESET activator 37. An aperture 711-4 has a contiguous boundary 1022 within which the indicator indicia $52_i$ and the RESET circuit activator 37 are disposed horizontally adjacent, and both are in partial vertical alignment with the TEST circuit activator 67, as shown. The arrangement again provides a positive, informative relationship between the indicator indicia and the RESET activator.

According to another aspect, associative features other than aperture boundaries and/or physical proximity of the indicator indicia and the RESET activator can be used to informatively associate the RESET activator with the indicator indicia. For example, alternate types of associative features may include markings, indentations and/or ridges. The feature(s) may be accomplished using any of a variety of manufacturing methods familiar to those skilled in the art such as transfer printing, painting, etching, molding, scribing, scoring, stamping or labeling.

FIG. 11 shows an exemplary device cover portion 203-5 in which an associative feature 1100 relates the indicator indicia $52_i$-2 to the RESET circuit activator 37 without requiring a boundary per se. Indicator indicia aperture 611-3 is disposed in cover surface 720. Light transmitting interface 411 provides light generated by the fault indicator 52 to indicator indicia $52_i$-2. The associative feature 1100 is a transfer-printed line disposed on the front cover between the RESET circuit activator 37 and the indicator indicia $52_i$-2. This configuration permits the indicator indicia to be located in the front cover where it is convenient to do so while maintaining a positive, informative relationship between the indicia and the RESET activator.

FIG. 12 shows an alternate aspect of the device cover portion 203-6 in which the association between the indicator indicia $52_i$-3 and the RESET circuit activator 37 is accomplished by the unequal sizes of the RESET and TEST activators 37, 67 and the spaced relationship between the indicator indicia $52_i$-3 and the RESET activator. Indicator aperture 611-4 is disposed in surface 720. Light transmitting interface 411 provides light generated by the tripped state indicator 52 to the indicator indicia $52_i$-3. The center of the indicator aperture 611-4 is disposed along a central horizontal axis 77 of the RESET circuit activator. By comparison, the center of the indicator aperture is not disposed along a corresponding axis 78 of the TEST circuit activator.

Figure 13:
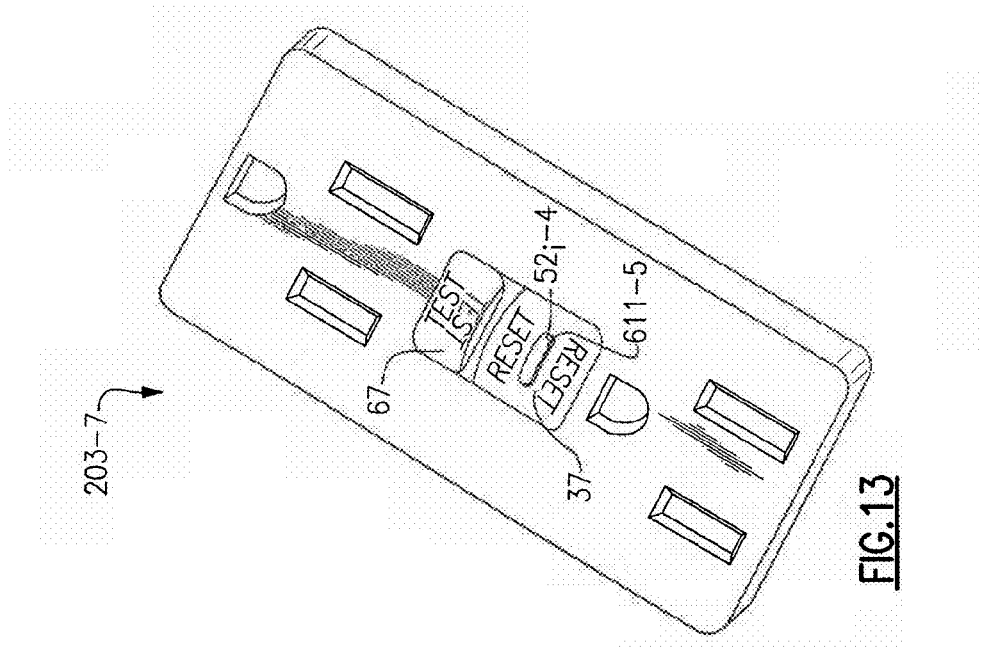
FIG. 13 is a perspective schematic view illustrating an alternative associative layout of the device according to an exemplary aspect of the invention.

FIG. 13 shows an alternate embodiment of the device cover portion 203-7. Enlarged RESET circuit activator 37 integrally includes the trip indicator indicia $52_i$-4. The RESET circuit activator may, for example, have an aperture 611-5 into which a flexible optical fiber or other suitable light transmitting interface 411 (not shown) can be disposed. The indicator indicia $52_i$-4 is informatively associated with the RESET activator since it is integral thereto. A transparent lens may be disposed inside aperture 611-5 to receive light from the transmitting interface, in which case indicia $52_i$-4 is substantially transmitted by the lens to an exterior surface of the lens. Aperture 611-5 is configured such that indicator indicia $52_i$-4 is visible in response to the circuit interrupter being in a tripped condition. The light-transmitting interface 411-1 can be a flexible fiber and thus movable in concert with motion of the RESET circuit activator.

Figure 14:
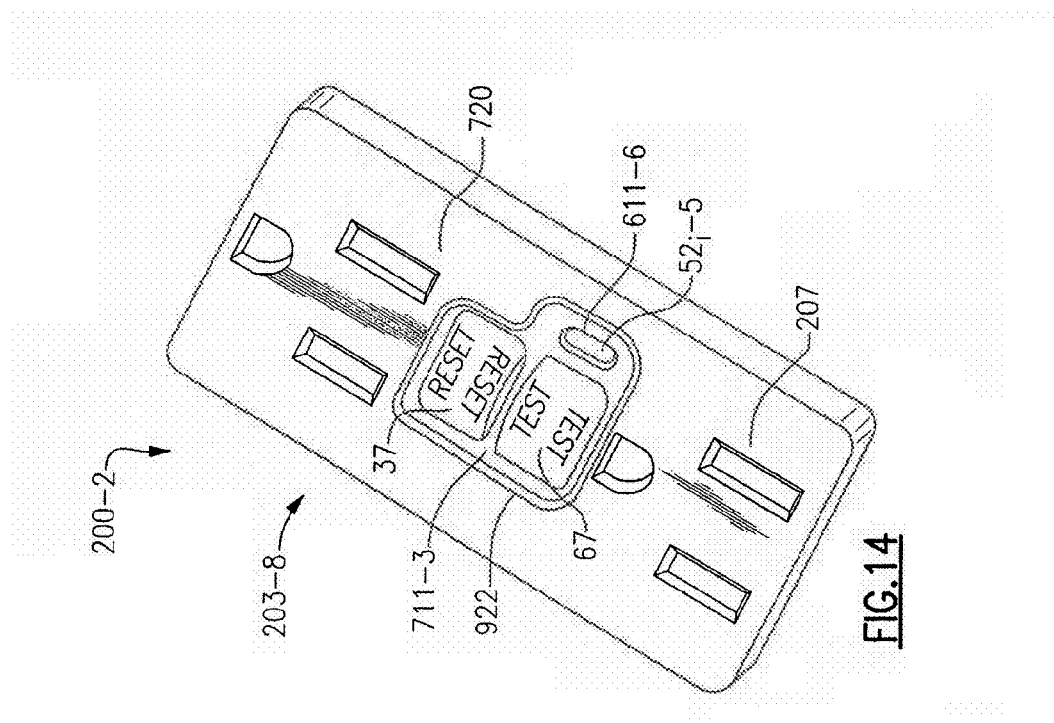
FIG. 14 is a perspective schematic view illustrating an alternative associative layout of the device according to an exemplary aspect of the invention.

FIG. 14 shows an alternate embodiment 200-2 of the invention. Cover portion 203-8 is similar to cover 203-2 of FIG. 8 except that the indicator indicia is a test indicator indicia $52_i$-5, having a positive, informative association with the TEST activator 67, rather than with RESET activator 37. Device cover portion 203-8 includes an L-shaped recessed aperture portion 711-3 with respect to surface 720 in which is disposed the circuit status indicator indicia aperture 611-6. In this aspect, the aperture 711-3 has a boundary 922 that encircles the RESET and TEST circuit activators as well as the indicator indicia. According to the instant aspect, the test indicator indicia relationship with the TEST activator is intended to serve as a test reminder. The test reminder indicator 52-2 provides light to the test indicator indicia $52_i$-5 by way of a light transmitting member similar to member 411. Test reminder indicator 52-2 is configured to activate on a periodic basis, e.g., monthly, to prompt the user to activate TEST circuit activator 67. Although the associative relationship is established by the layout of the aperture boundary 922 and the proximity of the indicator indicia with the TEST activator, other aspects that employ different boundaries or other configurations, described above, which associate the indicator indicia with the RESET circuit activator are suitable for the TEST association described herein.

Referring back to FIG. 1, a test reminder indicator 52-2 is connected to a timer 1200 in circuit 100. Timer 1200 is configured to generate an indication signal at predetermined period of time after the switch S1 has been activated, representing the amount of time since the previous test. The indication signal causes the test reminder indicator 52-2 (and test reminder indicia $52_i$-5) to activate. The user activates TEST circuit activator 67 whereupon timer 1200 is reset and the indicator and the indicia turn off. The process repeats itself each time the device is to be tested.

In an alternate aspect, indicator 52-2 and test reminder indicia $52_i$-5 only turn off if the circuit interrupter trips in response to the TEST circuit activator 67 having been activated. In other words, indicia $52_i$-5 stays activated if the protective device has experienced an end of life condition. Since the continuous activation of the indicia is abnormal, the user is motivated to investigate and, hopefully, replace the device. Timer 1200 may detect the tripped status of the circuit interrupter by way of an input signal from switch S4. Timer 1200 may be configured to generate an indication signal when power is connected to (or reconnected to) the line terminals.

In another aspect, timer 1200 provides a steady output signal to inform and prompt the user by way of the indicia that the device needs to be tested. When the TEST circuit activator is activated, the indicia turns off until the next time that a test cycle is due. However, if the device has experienced an end of life condition, timer 1200 is configured to output a recurring signal causing the indicia to blink. The blinking activation of the indicia prompts the user to investigate the operation of the device.

According to another embodiment, an end of life indicator is associated with the RESET circuit activator. The end of life indicator is configured to generate a steady-state indicia when the circuit interrupter is tripped. The circuit interrupter is configured so as to not be able to reset (or remain reset) in response to an end of life condition. Alternatively, the end of life indicator may be configured to generate a blinking indication when an end of life condition is detected. Accordingly, the end of life indicator indicates that the RESET circuit activator needs to be activated to restore load side power; however, a blinking indicia indicates to the user that there is an abnormal condition that has prevented reset. Since the device cannot be reset, it must be replaced. Thus the end of life indicator serves as a reminder that the device needs to be replaced.

Figure 15:
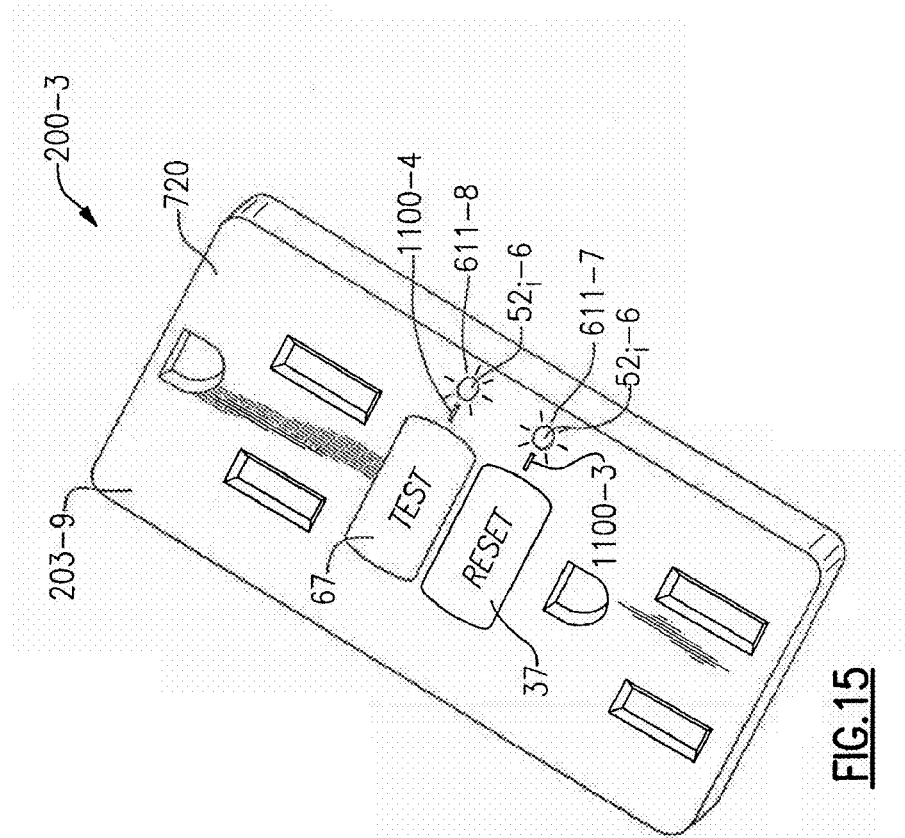
FIG. 15 is a perspective schematic view illustrating an alternative associative layout of the device according to an exemplary aspect of the invention.

FIG. 15 illustrates another exemplary embodiment 200-3 of the invention. Device cover 203-9 includes a RESET circuit activator 37 and reset indicator indicia $52_i$-6 informatively associated with the RESET activator by marking 1100-3, and a TEST circuit activator 67 and a test indicator indicia $52_i$-7 informatively associated with the TEST activator by marking 1100-4. Indicator indicia $52_i$-6, $52_i$-7 are visible through respective apertures 611-7, 611-8. Either of the indicator indicia can be in an 'OFF' state, a steady 'ON' state or a blinking 'ON' state to indicate a particular circuit status to the user, as described above. Both indicia may be of a single color (e.g., green) or they may display in different colors (e.g., green, red or others) to convey a particular status. In a related aspect, a single indicator indicia, as shown in FIGS. 7-10, may have a light transmission path that has two inputs or, alternatively, can receive and transmit two or more colors of light (e.g., green=OK; red=check circuit) to convey circuit status. The indicia may be steady or have a blinking frequency.

Figure 16:
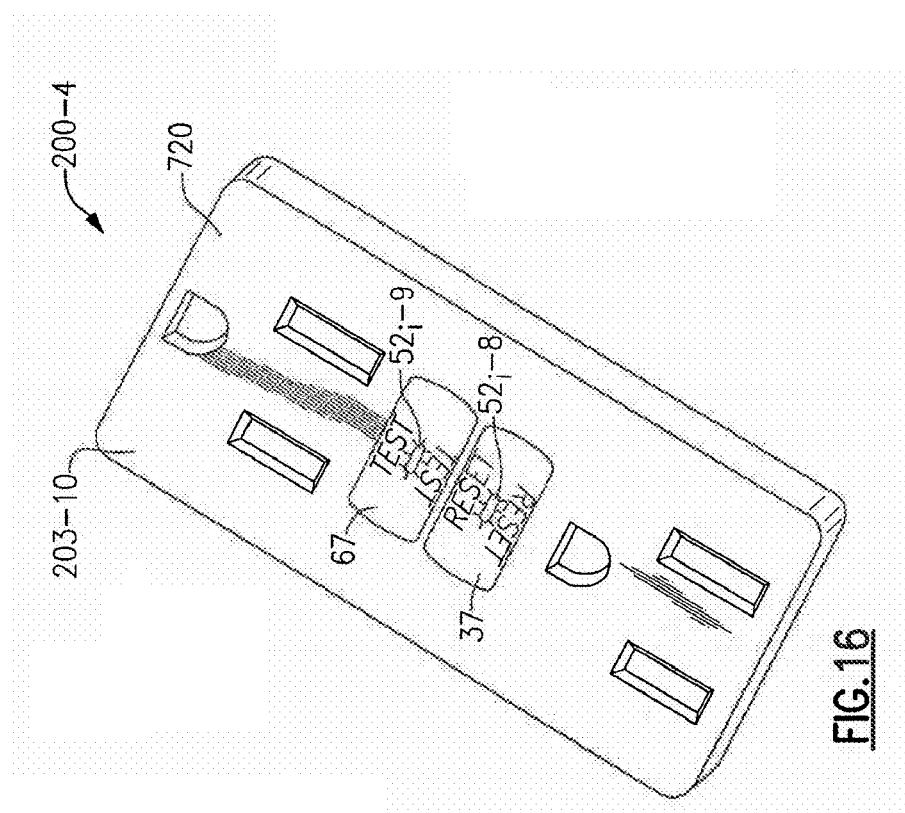
FIG. 16 is a perspective schematic view illustrating an alternative associative layout of the device according to an exemplary aspect of the invention.

FIG. 16 illustrates an alternative device aspect 203-10 in which both the TEST activator 67 and the RESET activator 37 integrally include a respective indicator indicia $52_i$-8, $52_i$-9. The indicia may illuminate in the same or different colors and may provide steady and/or blinking illumination in any preferred combination to inform the user about circuit status or condition.

In each of the foregoing described aspects, the shapes of the RESET and TEST circuit activators and the indicator indicia can be configured as desired for effect. The boundaries of the respective apertures and/or other markings used to form an associative relationship between the TEST or RESET activator and the indicator indicia may be shaped or configured accordingly.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. An electrical wiring device, comprising:
   a body member including a plurality of line terminals configured to be connected to a source of AC power, a plurality of load terminals, and a plurality of receptacle load terminals;
   a fault detection circuit disposed in the body member and coupled to the plurality of line terminals and the plurality of load terminals, the fault detection circuit being configured to derive power from the plurality of line terminals, the fault detection circuit including a test facility initiated by a test button, the fault detection circuit being configured to generate a fault detection signal in response to detecting a predetermined condition propagating on the plurality of line terminals or the plurality of load terminals;
   a circuit interrupter assembly coupled to the fault detection circuit, the circuit interrupter assembly including five sets of interrupting contacts, four sets of the five sets of interrupting contacts being configured to provide electrical continuity between the plurality of line terminals and the plurality of load terminals in a reset state and configured to interrupt the electrical continuity in response to the fault detection signal to effect a tripped state and one set of the five sets of interrupting contacts being configured to deenergize the fault detection circuit in the tripped state;
   a reset mechanism including a user-accessible reset button coupled to a reset linkage, a depression of the reset button directs the reset linkage to drive the circuit interrupter assembly from the tripped state to the reset state;
   an indicator circuit coupled to at least one indicator element and the circuit interrupter, the indicator circuit energizing the at least one indicator element in accordance with a wiring state of the circuit interrupter assembly or an operational status of the wiring device; and
   a device cover portion configured to be coupled to the body member, the device cover including a central portion configured to accommodate the test button and the reset button therein, the central portion also including an indicator location feature accommodating the at least one indicator element, the indicator location feature being configured to positively associate the at least one indicator element in an energized state to the reset button such that an appropriate response to the wiring state is communicated to a user.

2. The electrical device of claim 1, wherein the predetermined condition includes a fault condition or a simulated fault condition.

3. The electrical device of claim 1, wherein the RESET button is physically larger than the TEST button.

4. The electrical device of claim 1, wherein the indicator location feature is disposed along a central axis of one of the RESET button and the TEST button, but not along a central axis of the other.

5. The electrical device of claim 1, wherein the central portion is recessed relative to flat major surfaces of the device cover portion disposed at each end thereof, the central portion having a contiguous first boundary that includes the indicator location feature.

6. The electrical device of claim 1, wherein indication location feature is integrally disposed within the RESET button.

7. The electrical device of claim 1, wherein the indication location feature is integrally disposed within the TEST button.

8. The electrical device of claim 5, wherein the central portion has a second boundary between at least two of the RESET button, the TEST button and the indication location feature.

9. The electrical device of claim 1, wherein the at least one indicator element includes a LED.

10. The electrical device of claim 1, further comprising a light conducting physical interface between the at least one indicator element and an indicator indicia viewing aperture.

11. The electrical device of claim 10, wherein the physical interface has an input adapted to receive and transmit a plurality of fault status indicator illumination colors.

12. The electrical device of claim 10, wherein the physical interface is an optical waveguide.

13. The electrical device of claim 12, wherein the optical waveguide is flexibly coupled at a distal end thereof to the at least one of the TEST button the RESET button.

14. The electrical device of claim 10, wherein a lens is disposed at a distal end of the physical interface.

15. The electrical device of claim 1, wherein the five sets of interrupting contacts further comprises an auxiliary switch that is electrically coupled to the circuit fault protection component, further wherein the at least one indicator element is electrically coupled to the auxiliary switch.

16. The electrical device of claim 1, wherein the circuit interrupter assembly includes a two-pole circuit interrupter.

17. The electrical device of claim 1, wherein the circuit interrupter assembly includes a four-pole circuit interrupter.

18. The electrical device of claim 1, wherein the indicator location feature includes at least one of a ridge, an indentation, a marking, a label or a scoring configured to positively associate the at least one indicator element with at least one of the RESET button and the TEST button.

19. The electrical device of claim 1, wherein the at least one indicator element provides a steady state illumination.

20. The electrical device of claim 1, wherein the at least one indicator element provides a blinking illumination associated with an end of life condition.

21. The electrical device of claim 1, wherein the at least one indicator element includes a first indicator element positively associated with the reset button and a second indicator element positively associated with the test button.

22. The electrical device of claim 21, wherein the indicator circuit includes a timing circuit configured to energize the second indicator element after a predetermined period of time has elapsed.

23. An electrical wiring device, comprising:
- a body member including a plurality of line terminals configured to be connected to a source of AC power, a plurality of load terminals, and a plurality of receptacle load terminals;
- a fault detection circuit disposed in the body member and coupled to the plurality of line terminals and the plurality of load terminals, the fault detection circuit being configured to derive power from the plurality of line terminals, the fault detection circuit including a test facility initiated by a test button, the fault detection circuit being configured to generate a fault detection signal in response to detecting a predetermined condition propagating on the plurality of line terminals or the plurality of load terminals;
- a circuit interrupter assembly coupled to the fault detection circuit, the circuit interrupter assembly including five sets of interrupting contacts that are configured to provide electrical continuity between the plurality of line terminals and the plurality of load terminals in a reset state and configured to interrupt the electrical continuity in response to the fault detection signal to effect a tripped state, at least one of the five sets of interrupting contacts being configured to deenergize the fault detection circuit in the tripped state;
- a reset mechanism including a user-accessible reset button coupled to a reset linkage, a depression of the reset button directs the reset linkage to drive the circuit interrupter assembly from the tripped state to the reset state;
- an indicator circuit coupled to a reset indicator element, a test indicator element and the circuit interrupter, the indicator circuit energizing the reset indicator element in the tripped state, or an operational status of the wiring device, the test indicator element being energized to provide a test reminder indication; and
- a device cover portion configured to be coupled to the body member, the device cover including a central portion configured to accommodate the test button and the reset button therein, the central portion also including an indicator location feature that accommodates the reset indicator element and the test indicator element, the indicator location feature being configured to positively associate the reset indicator element in an energized state to the reset button and positively associate the test indicator element in an energized state to the test button such that an appropriate action is communicated to a user.

* * * * *